Figure 1:
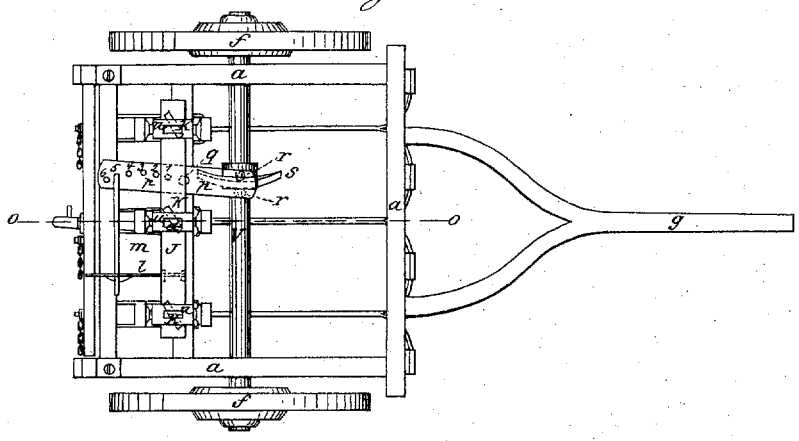

2 Sheets—Sheet 1.

L. MOORE.

Grain-Drill.

No. 1,336. Reissued Aug. 26. 1862

AM. PHOTO-LITHO. CO. N.Y. (OSBORNE'S PROCESS.)

L. MOORE.
Grain-Drill.
No. 1,336
Reissued Aug. 26. 1862
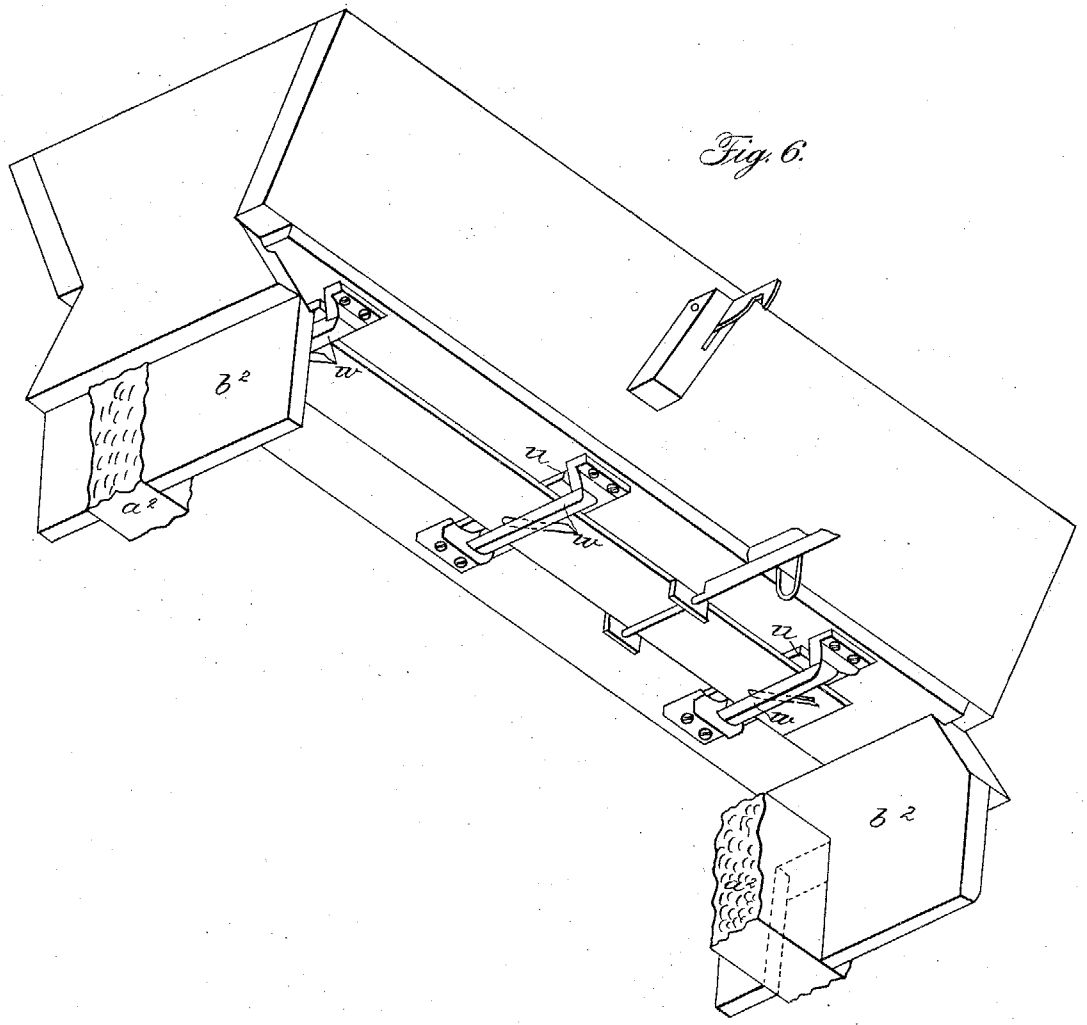
Witnesses:
Octavius Knight
Charles Smith
Inventor:
Lewis Moore
Per Munn & Co
Attys
AM. PHOTO-LITHO. CO. N.Y. (OSBORNE'S PROCESS.)

UNITED STATES PATENT OFFICE.

LEWIS MOORE, OF YPSILANTI, MICHIGAN.

IMPROVEMENT IN SEED-PLANTERS.

Specification forming part of Letters Patent No. 224, dated July 2, 1850; Reissue No. ——, dated October 12, 1852; Reissue No. 1,336, dated August 26, 1862.

*To all whom it may concern:*

Be it known that I, LEWIS MOORE, formerly of Bart, in the State of Pennsylvania, now of Ypsilanti, in the county of Washtenaw and State of Michigan, have invented certain new and useful Improvements in Seeding-Machines; and I do hereby declare that the following is a full and exact description thereof, reference being had to the accompanying drawings, making part of this specification.

Seed-planters are in common use in which the feeding action is accomplished by the unvarying motion of a sliding gage pierced with apertures corresponding more or less nearly with those in the grated or perforated bottom of the hopper over or under which it slides; but these are subject to serious objections, as not only is the seed let down intermittingly, but a constant quantity is invariably sown, unless the feeding apparatus is changed, which cannot be done while the machine is in motion, and, besides, on account of parallel edges of the grate and gage apertures coming together, the seed is caught between them, and thereby clogs the machine, and is more or less broken.

One characteristic of my invention is the attainment of a uniform and continual distribution of the seed upon the ground by means of oblique apertures in the sliding gage or feeding plate, in connection with apertures in the bottom of the hopper whose sides are parallel with those of the hopper, or at least form a considerable angle with those of the gage-apertures, and all clogging or breaking of the seed is thereby obviated.

Another characteristic of my invention consists in imparting a reciprocating motion of variable extent to a gage sliding in a direction transverse to the motion of the machine, operating in connection with a series of apertures in the hopper, as hereinafter explained.

Another improvement in my machine consists in regulating the depth at which the drill-teeth plow, and raising them singly or all together from the ground by means of a flat vibrating bar and by chains adjustable in length, reaching from the several drill-teeth to the said bar, and readily attached thereto or detached therefrom, the peculiar construction and arrangement of which device, as hereinafter described, renders it the most effective and simple means for performing its assigned functions that has hitherto been invented.

My invention further consists in certain improved devices for supporting the hopper upon the frame and the seeding-slide beneath the hopper.

Figure 3:
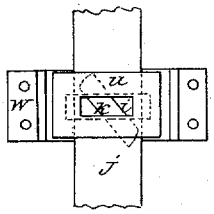
Figure 5:
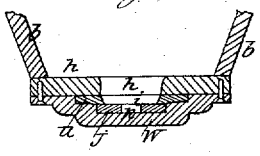
Figure 4:
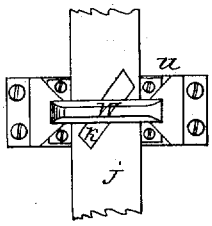
Figure 2:
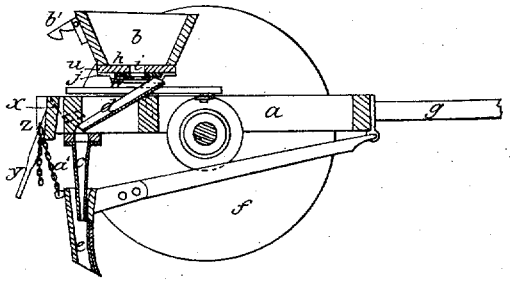

In the accompanying drawings, Figure 1 is a plan or top view of the machine, the hopper being removed in order to show the reciprocating feeding or gage plate and the relative positions of its oblique apertures and the oblong transverse apertures in the grate-plates, which are secured to the bottom of the hopper. Fig. 2 is a longitudinal vertical section of the same in the line *o o* of Fig. 1; Fig. 3, plan of a portion detached; Fig. 4, plan of the same portion inverted. Fig. 5 is a transverse vertical section through one of the feeding-passages and part of the hopper. Fig. 6 is a perspective view of the hopper in an inverted position.

The same letters refer to like parts in all the figures.

The frame *a*, hopper *b*, guiding-tubes *c*, chute *d*, drill-teeth *e*, wheels *f f*, pole *g*, &c., are constructed in any usual and convenient manner, and need no description, not forming any part of my invention.

The bottom *h* of the hopper *b* is provided with transverse oblong apertures at distances apart corresponding with those of the drill-teeth below, the sides of which apertures I usually arrange parallel with those of the hopper, and a plate, *u*, is secured under each of said apertures, so that an aperture, *i*, with which each plate is furnished, will fall directly under and correspond in shape, size, and position with said apertures in the bottom of the hopper.

A loop, *w*, is formed or placed underneath each plate, *u*, corresponding in shape, size, and position with its aperture directly above, and serves both to support and guide the gage-plates *j* (presently to be described) and to close the apertures above when the machine is not in motion. The gage-plate *j* slides in the loops *w w*, &c., the whole length of the hopper, and is furnished with oblong apertures *k k*, &c., equal in number to and corresponding in position with the apertures in the bottom of the hopper; but their sides are formed obliquely to those of the apertures of the hopper, usually at an angle of about forty-five degrees.

A reciprocating motion is imparted to the gage-plate by means of a lever, *p*, moving on a fulcrum or pivot, *q*, to which lever a uniform vibratory motion is given by a curved or undulating disk, *s*, fixed upon the revolving shaft *v* of the conveying-wheels and moving between guides *r r* on said lever, which is provided with a series of holes, 1 2 3 4 5 6, at different distances from its fulcrum *q*, into which holes is inserted the hooked end of a rod, *m*, attached by a loose joint to the gage-plate *j*, or to an arm, *l*, projecting from the same. Said rod is situated so that it may be readily managed by the operator of the machine, who, by shifting the hook into different holes of the lever *p*, can vary the extent of motion imparted to the gage-plate *j*, and thereby vary and regulate the quantity of seed sown, as presently to be described, and can also stop the motion of the said gage-plate by holding the hook from the lever *r*, and consequently stop the feeding of the machine when turning or at other times passing over ground not desired to be sown. When the gage-plate is not in motion the seed which fills the coinciding apertures *i k* is supported by the loop *w* and is not discharged; but when said gage-plate is put in motion the oblique sides of its apertures are continually and gradually pushing the grain which fills them alternately on one side and the other of the loops *w w* into the drill-teeth, while the place of the grain thus discharged is constantly supplied by more grain from the hopper above.

It is obvious that the greater the extent of the reciprocating motion of the gage-plate or feeder the greater the quantity of seed sown, and vice versa. The seed is also constantly and evenly distributed to the ground, while the angle which the oblique apertures *k k*, &c., form with the transverse apertures *i i*, &c., obviates any clogging or breaking of the seed, which would otherwise be occasioned.

A flat eccentrically-vibrating bar, X, is mounted in bearings across the rear of the machine, and is furnished with a handle, *y*, by which it is turned up and down. A catch, *b'*, is attached to the rear of the hopper *b* for holding the said eccentric vibratory bar when turned up. The rear side of it, when turned down, is provided with a series of hooks, Z, corresponding in number and situation with the drill-teeth *e*, to each of which a chain, *a'*, is attached. Said chains are attached to their respective hooks Z by such a link, exchangeable at pleasure, as will give the required height at which the drill-teeth should be suspended when the bar X is turned down. When the machine is in operation the eccentric bar is placed in its lowest position, and the depth to which the drill-teeth plow is varied and regulated simply by causing said bar to be vibrated slightly forward and backward, which movement is quite gradual, as the flattened eccentric form of the bar causes, when it is turned down, the chains to be suspended in a direction not far from the center of the vibration, so that its first motion from that position acts to swerve rather than lift the chains. On account of the same peculiarity of construction, said bar, when turned completely up, raises the drill-teeth more suddenly and promptly than would a round roller, and when it is at its highest position it is held up with ease, because the lines of support to the drill-teeth become again nearly in the center of the direction of the bar's vibration. When it is desired to raise a single drill-tooth its chain is lifted separately without disturbing the bar.

$b^2$ $b^2$ are brackets projecting downward from the hopper at or near each end and straddling the cross-bar $a^2$, so as to support the hopper firmly upon the frame or permit its ready removal. By means of this device any seed remaining in the hopper may be readily emptied out, or the hopper, without emptying, may be carried to a place of security.

Having thus fully described my improvements in seeding-machines, I wish it to be understood that I do not claim a reciprocating gage-plate having apertures parallel and corresponding with apertures in the bottom of the hopper, as this, I am aware, is in use in other machines; but

What I do claim as my invention, and desire to secure by Letters Patent, is—

1. A seeding-slide having apertures with sides oblique to the sides of corresponding apertures in the hopper bottom or plate *u*, when combined with any suitable device to impart a reciprocating motion to the said slide, substantially as described.

2. In combination with a hopper or seed-box having a number of apertures for the discharge of seed, a perforated seeding-slide having a reciprocating motion transverse to the motion of the machine and adjustable in extent for the purpose of varying the quantity of seed sown.

3. The combination of the perforated vibrating lever *p* and pivoted rod *m* with a cam, *s*, and seeding-slide *f*, to vary the motion of the said slide, substantially as and for the purposes explained.

4. Raising or lowering the drill-teeth or hoes simultaneously by means of chains *a'*, or their equivalent, attached to the rear edge of a flat bar or board, X, hinged by its front edge to the frame. and provided with a lever, *y*, projecting backward from it, all substantially as herein shown and described.

5. The combination of the hook or catch *b'*, flat bar or board X, and lever $y$, all constructed, arranged, and employed in the manner and for the purposes set forth.

6. Supporting the hopper or seed-box upon the frame of the machine by means of brackets $b^2$ $b^2$, straddling the beam $a^2$, so as to secure the hopper in position without fastenings and permit its ready removal.

7. Suspending the seeding-slide beneath the hopper by means of loops W, placed beneath the apertures $h$ $i$ in the hopper-bottom, substantially as and for the purposes set forth.

LEWIS MOORE.

Witnesses:

D. B. GREENE,

ALFRED THOMPSON.